Dec. 26, 1950     O. L. HARRISON ET AL     2,535,851
CLOVER SEED CLEANING MILL

Filed May 29, 1947     4 Sheets-Sheet 1

Inventors
OWEN L. HARRISON and
JACOB HART

By *Irving R. M. Cathran*

THEIR Attorney

Dec. 26, 1950     O. L. HARRISON ET AL     2,535,851
CLOVER SEED CLEANING MILL
Filed May 29, 1947     4 Sheets-Sheet 2
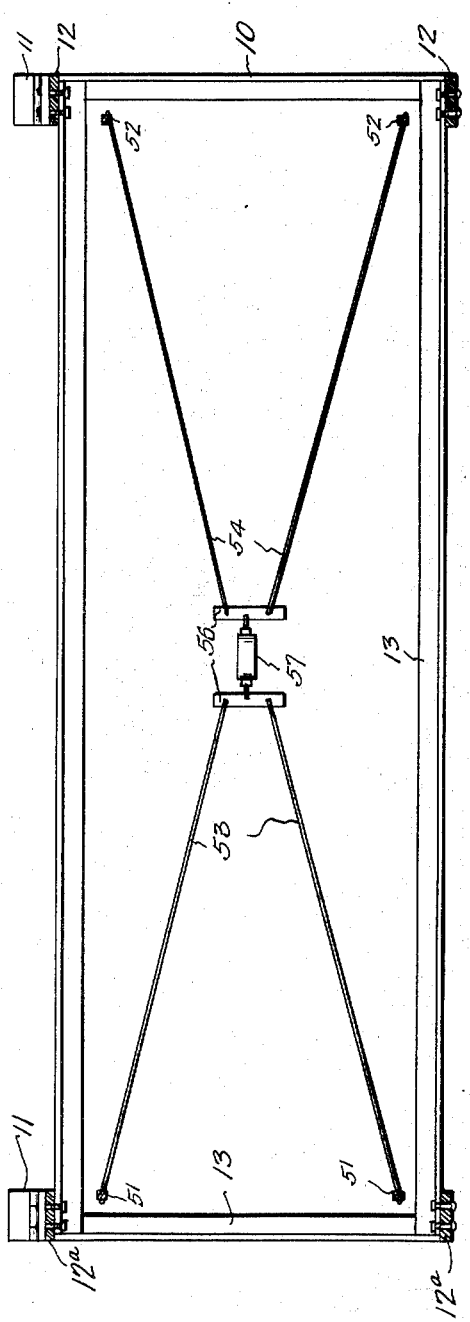
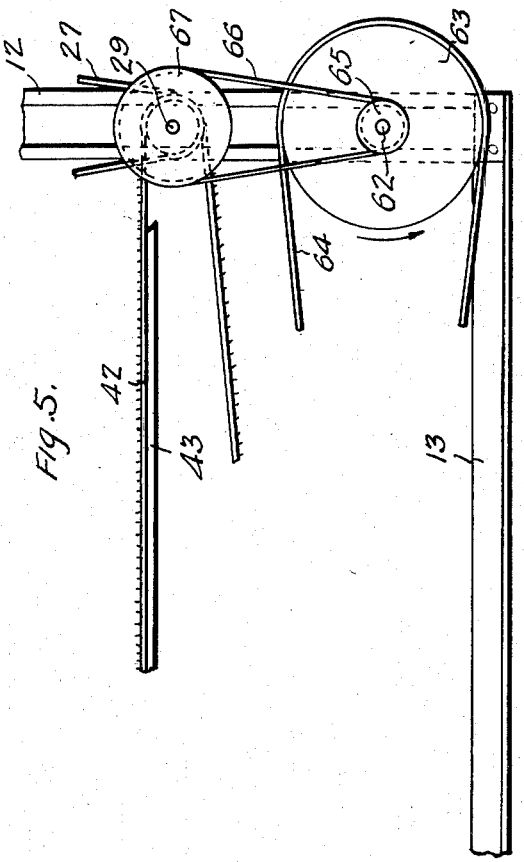
INVENTORS
OWEN L. HARRISON and
BY    JACOB HART
THEIR ATTY Dec. 26, 1950  O. L. HARRISON ET AL  2,535,851
CLOVER SEED CLEANING MILL
Filed May 29, 1947  4 Sheets-Sheet 3
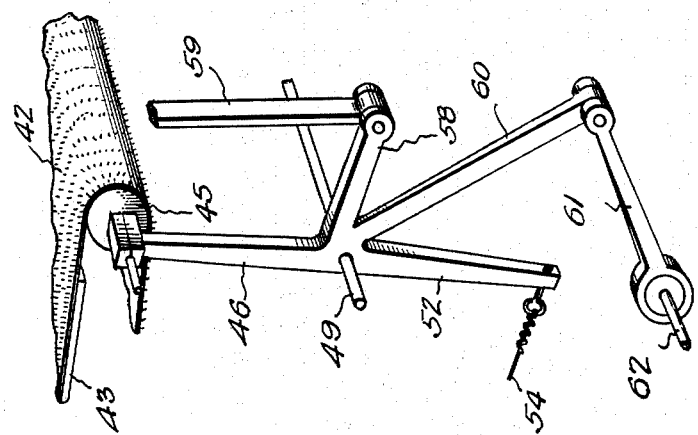
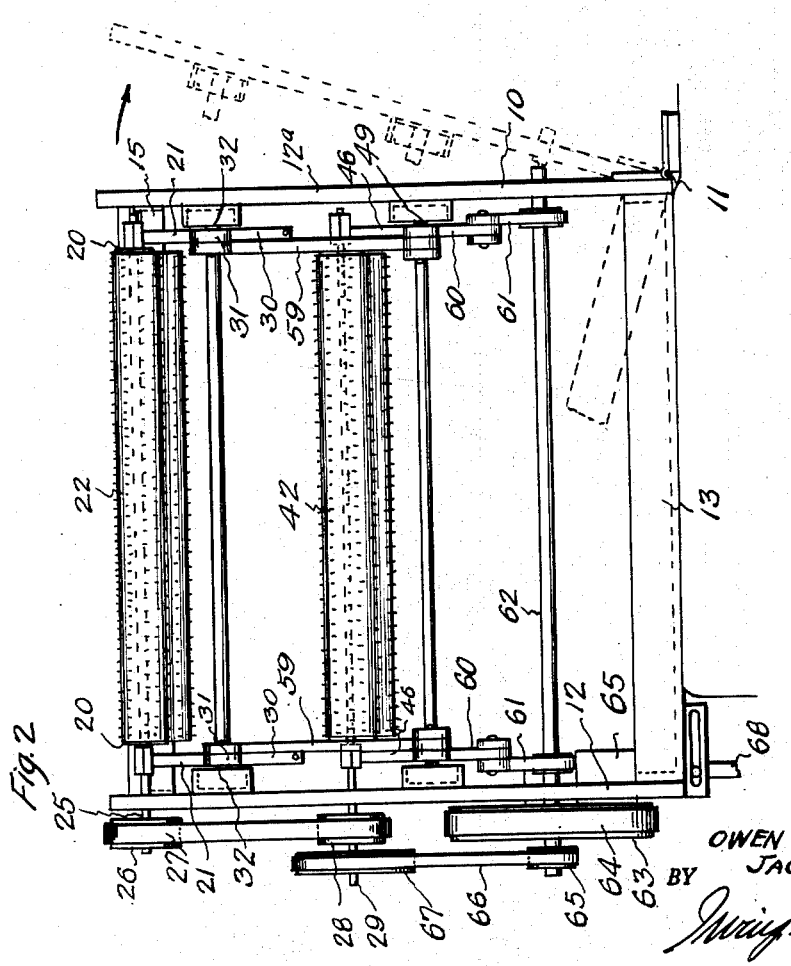
INVENTORS
OWEN L. HARRISON and
JACOB HART
BY
THEIR ATTY.

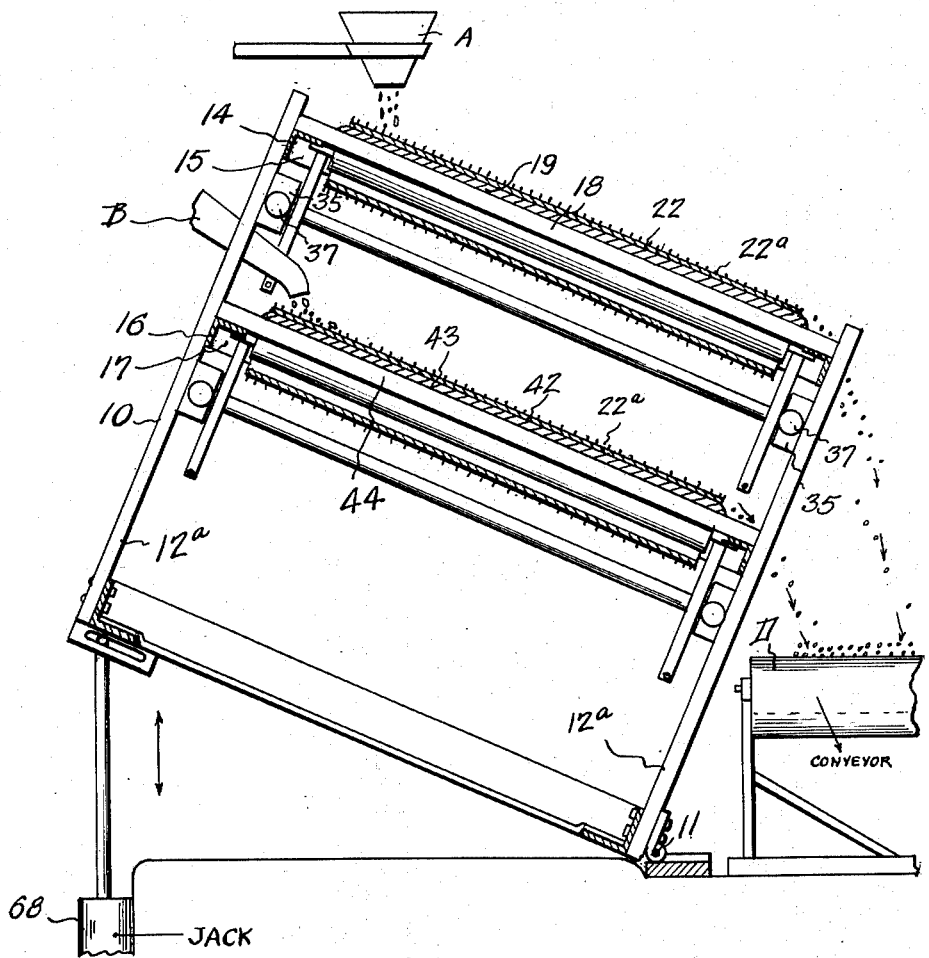
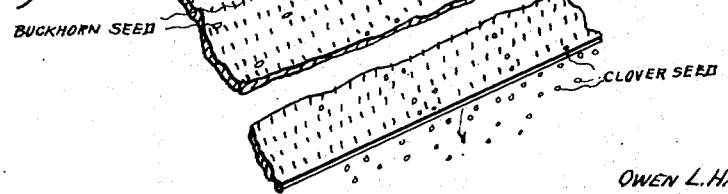

Patented Dec. 26, 1950

2,535,851

UNITED STATES PATENT OFFICE 2,535,851

CLOVER SEED CLEANING MILL

Owen L. Harrison and Jacob Hart, Milledgeville, Ill.

Application May 29, 1947, Serial No. 751,352

5 Claims. (Cl. 209—114)

This invention relates to a clover seed cleaning mill, and has for one of its objects the production of a simple and efficient means for separating buckhorn seed from clover seed.

A further object of this invention is the production of a simple and efficient seed cleaning mill having an apron of woven material over which seeds are adapted to pass, which material is provided with a light nap to trap and carry the buckhorn seed longitudinally of the apron while at the same time permitting the clover seed to roll laterally of the apron for the purpose of separating the clover seed from the buckhorn seed.

A further object of this invention is the production of a simple and efficient mill having a longitudinally movable conveyor apron which is vibrated longitudinally in the direction of travel of the apron to agitate the seed and to facilitate the separation of the clover seed from the buckhorn seed.

A still further object of this invention is the production of a simple and efficient seed cleaning mill comprising a longitudinally movable conveyor apron which apron is provided with a flat smooth table beneath the upper run of the apron to hold the apron flat and to prevent vertical movement of the apron relative to the table during operation.

Other objects and advantages of this invention will appear throughout the following specification and claims.

In the drawings:

Figure 2 is a front end elevational view in a vertical position;

Figure 3 is a horizontal sectional view of the frame with the driving mechanism removed and illustrating the tightening means for the vibrating mechanism;

Figure 4 is a vertical sectional view taken on line 4—4 of Figure 1, the frame being shown in an inclined position;

Figure 5 is an enlarged fragmentary side elevational view of the frame illustrating the conveyor driving means;

Figure 6 is a perspective view of one of the oscillating levers;

Figure 8 is a fragmentary perspective view of one of the conveyor belts or aprons illustrating the nap formed thereon.

Figure 1:
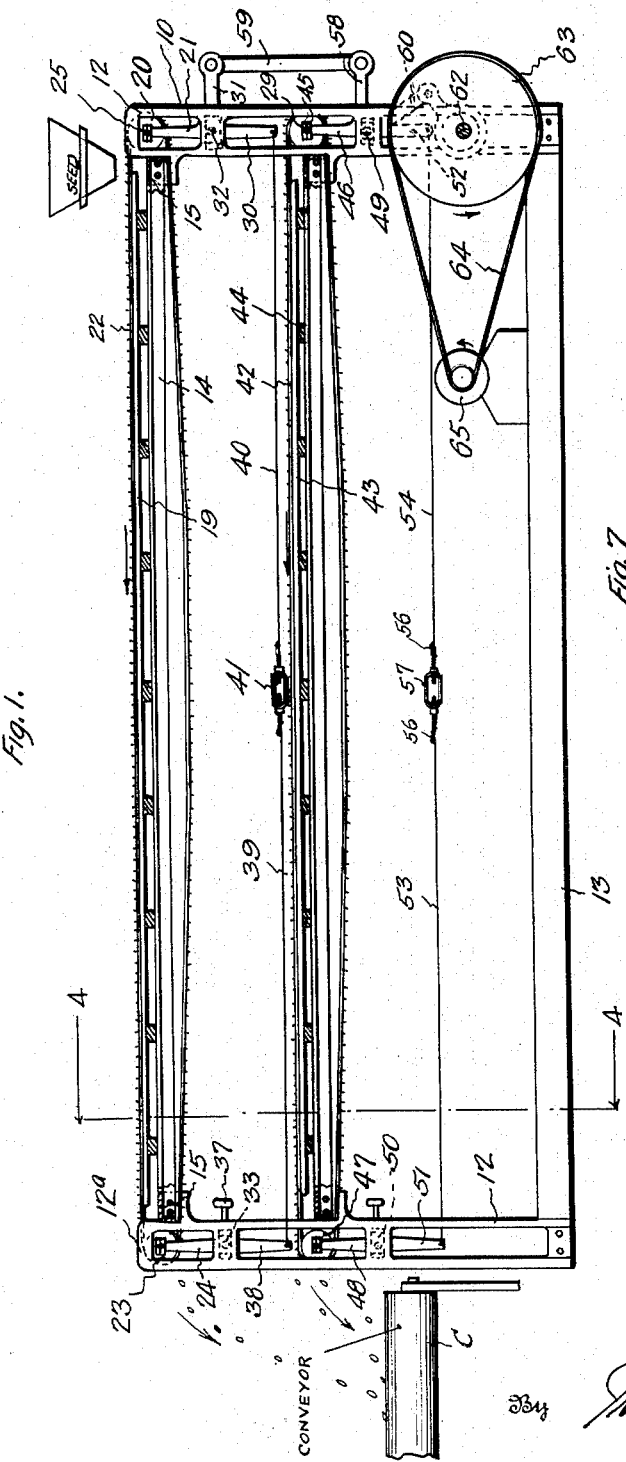
Figure 1 is a longitudinal sectional view of the mill.

By referring to the drawings, it will be seen that 10 designates a frame which is hinged along one side as indicated at 11, so that the frame 10 may be swung from a vertical or upright position shown in Figure 2, to an inclined or laterally tilted position shown in Figure 4. The frame 10 comprises corner posts 12 and 12ª, preferably four in number, which are braced longitudinally in any suitable manner by angle iron braces 13 at the bottom of the frame. The frame 10 is also provided with top longitudinal angle iron braces 14 which extend longitudinally of the frame and transverse angle iron braces 15 which extend transversely of the frame 10 near the posts 12 and 12ª. Intermediate longitudinally extending angle iron braces 16 are located intermediate the top braces and the bottom braces and are secured to the end posts 12 and 12ª and transverse angle iron braces 17 are located intermediate the top transverse braces 15 and the bottom frame 13 and preferably abut the longitudinal braces 16. The end posts 12 and 12ª are therefore braced at the bottom, the top and substantially midway their length to provide a rigid and well-braced frame 10.

The longitudinal braces or rails 14 support transverse ribs 18 which ribs 18 extend from one rail or brace 14 to the other, and a flat smooth rigid panel or board constituting a conveyor apron supporting table 19 is supported upon these transverse ribs 18 for the full length of the rails 14 from one end of the frame 10 to the other thereby anchoring the table 19 to the frame of the machine. A primary apron supporting pulley or roller 20 is supported near the top of the frame 10 upon the primary oscillating crank levers 21. The roller 20 extends transversely across the frame 10 in a position to support the conveyor apron 22 in a plane to travel longitudinally of and to fit flat upon the table 19 for the full length of the frame 10 from the roller 20 at one end of the frame 10 to and over the companion roller 23 at the opposite end of the frame 10. The roller 23 is carried upon the upper ends of the companion pivoted supporting levers 24 adjacent the upper end of the frame 10. The roller 20 is carried by a shaft 25 which is driven from a pulley 26 and belt 27. The belt 27 is in turn driven from a pulley 28 mounted upon a shaft 29.

Figure 7:
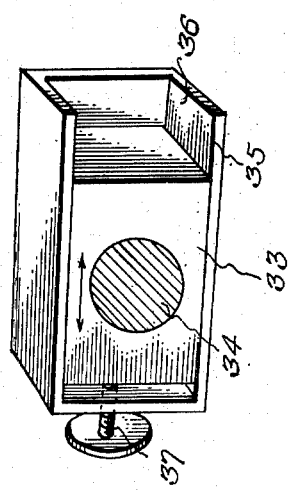
Figure 7 is a sectional perspective view of one of the adjustable journal boxes which support the rocker arms of the oscillating mechanism.

Each bell crank lever 21 is provided with a depending arm 30 and a right-angularly extending crank arm 31. Each lever 21 is pivotally supported upon a suitable journal 32 carried by its supporting post—see Figure 1. Each lever 24 which supports the rollers 23 is journalled upon an adjustable journal block 33 preferably made of bronze, which block carries the journal pin 34 of the lever 24. The block 33 is adjustable toward or away from the lever 21 to adjust the position of the block 33 within the box 35, shown in detail in Figure 7. Each box 35 is secured to the inner face of its supporting post with the open end 36 extending in the direction of travel of the apron 22 to facilitate the placing of the blocks 33 in the boxes 35. An adjusting screw 37 moves the block 33 for a short distance to a selected position within the box 35. By adjusting the journal or bearing block 33 upon one side of the machine relative to the block 33 on the opposite side of the machine, the position of the levers 24 may be shifted to cause the apron 22 to run true and to remain on the rollers 23 by changing the transverse angle of the roller 23 relative to the frame 10. Since the apron 22 tends to travel or shift toward one side of the machine, particularly when the frame is tilted, this difficulty may be overcome by adjusting the blocks 33 that regulate the tension pull of the roller 23 upon the apron 22 throughout the transverse area of the apron. Each lever 24 is provided with a depending arm 38. The arms 38 are connected to wires 39 and the arms 30 are connected to wires 40. These wires 39 and 40 are connected to a suitable turnbuckle 41 in a manner similar to that shown in Figure 3 for the purpose of regulating the tension of the apron 22. This mechanism constitutes a tension means to regulate the tension of the apron 22. By means of a proper connection, an even tension may be provided.

As shown in Figure 1, a second conveyor belt or apron 42 is supported below the belt or apron 22 in a manner similar to that described relative to apron 22. The belt or apron 42 is braced by the table 43, which table is supported by the transverse ribs 44 carried by the side rails or angle irons 16 thereby anchoring the table 43 to the frame of the machine. The belt 42 is driven by a transverse roller 45 carried by the bell crank levers 46 at the entrance end of the frame and the roller 47, which roller 47 is carried by the levers 48 at the opposite end of the machine. The levers 46 are directly under the levers 21 and are journalled, as at 49, upon the respective supporting posts 12 at the entrance end of the machine. The levers 48 are mounted upon adjustable journals 50 in a similar manner described relative to journals 33 and illustrated in detail in Figure 7, to adjust or change the transverse angle of the roller 47. Each lever 48 is provided with a depending arm 51 and each lever 46 is also provided with a depending arm 52. The arms 51 and 52 are connected to wires 53 and 54, respectively. These wires 53 and 54 are secured to plates 56 and these plates 56 are connected by means of a suitable turnbuckle for adjusting the tension pull upon the levers 46 and 48. This mechanism constitutes a tension means to regulate the tension of the apron. The upper apron 22 and lower apron 42 are mounted and adjusted in a similar manner as described above and illustrated in Figures 1, 2 and 3. Any desired number of aprons may be employed without departing from the spirit of the invention. Each lever 46 is provided with a crank arm 58 and the arm 58 of one lever 46 is connected to the arm 31 of the lever 21 located just above by means of a link 59 so that the levers 21 and 46 may oscillate in unison. Each lever 46 is provided with a downwardly inclined actuating arm 60, which is connected to a link 61. This link 61 is eccentrically connected to the driving shaft 62 for the purpose of slightly oscillating the levers 21 and 46 and levers 24 and 48 which are connected together as defined above. This action will bodily shift the aprons 22 and 42 slightly back and forth in endwise directions to shake the seed carried thereby as the aprons travel toward the discharge end of the mill. It should be noted by considering Figure 4, that the tables 19 and 43 extend the full width of the aprons 22 and 42, and since these tables 19 and 43 are carried by the frame they are non-agitating while the aprons are free to agitate.

The driving shaft 62 carries a balance driving wheel 63 which is driven by means of a belt 64 from a suitable motor 65 mounted in any suitable manner and in any suitable location. The shaft 62 also carries a pulley 65 for driving the belt 66, which in turn drives the pulley 67 carried by the shaft 29, as shown in Figure 2. From the foregoing description, it will be noted that the motor 65 drives the pulley 63 from the belt 64 to rotate the shaft 62 and the shaft 62 operates the oscillating mechanism shown in detail in Figure 6. The shaft 29 and lower belt or apron 42 are driven from pulleys 65 and 67 by means of belt 66. The shaft 25 and upper belt or apron 22 are driven from pulleys 26 and 28 through the medium of belt 27.

The frame 10 is hinged, as at 11, and this frame may be tilted toward one side to the position shown in Figure 4, and as is also indicated in dotted lines in Figure 2. Any suitable means may be employed for tilting the frame 10 of the mill, such for instance the jack 68, shown in Figure 4. The mill may be tilted manually and suitable supports placed thereunder, or any suitable lifting means may be employed to tilt the mill laterally at a desired selected incline without departing from the spirit of the invention.

By considering the drawings, and particularly Figure 8, it will be noted that the conveyor belts or aprons 22 and 42 are formed of woven material such as canvas, and have a light nap to trap the buckhorn seeds. The nap comprises a plurality of fiber strands standing up upon the surface of the fabric. As the seed is delivered to the aprons 22 and 42 near the forward end of each belt near the elevated edges thereof, as indicated in Figure 4, and as the aprons 22 and 42 travel away from the delivery spouts A and B, while at the same time these aprons are oscillated or shaken slightly in an endwise direction, the seed will tend to roll transversely of the aprons 22 and 42 toward the lower edges of the belts. However, since the buckhorn seeds are longer than they are wide, and have one substantially long or flat side, and are in the shape of a tiny canoe, the nap, the agitating motion of the aprons, as well as the direction of travel of the belts or aprons, will tend to move the buckhorn seeds longitudinally of the conveyors where the buckhorn seeds may be discharged over the ends of the conveyor aprons upon a conveyor C or other bin or receptacle shown in Figure 1.

The clover seeds, however, being substantially round will tend to roll between the hairs or nap in a transverse direction toward the lower edge of the aprons 22 and 42, and will be discharged upon a suitable conveyor, bin or other receptacle D shown in Figure 4. Attention is invited to Figure 8 which illustrates the passage of the seeds over the aprons. It should be understood that any type of spout or delivery means may be substituted for the spouts A and B, without departing from the spirit of the invention, since the illustration of the spouts A and B is only conventional and constitutes auxiliary apparatus which may be varied to suit the convenience of the operator. This is also true of the lifting mechanism 68 and conveyors C and D.

It is important to note that the seed should be run onto or fed to the aprons at a gradual speed and not too rapidly and in this way the buckhorn seed will not tend to run down transversely of the apron with the clover seed. It should be further noted that the transverse tilt of the mill may be regulated or adjusted to suit the type of seed which passes over the apron. If desired, the seed may be run through the mill several times to more thoroughly separate the clover seed from the buckhorn seed. The length of the apron or aprons may be selected, according to the volume of seed to be handled, and the longer the apron in proportion to its width, the more seed may flow along the apron or aprons. It should be further noted that the present invention embodies an endless conveyor apron or aprons having a nap, which apron is vibrated longitudinally and is inclined transversely, all of which features contribute to the separation of the buckhorn seed from the clover seed, as the seed pass along the apron or aprons. It should be noted that the transverse angle of inclination of the conveyor apron is less than the angle of repose of the clover seed. However, as the apron is vibrated in a longitudinal direction the clover seed will roll down the transverse incline of the apron through the nap thereof and the buckhorn seed will be shifted longitudinally of the apron through the nap of the apron toward the end of the apron.

It should be noted, that, as clearly shown in Figure 8, seed of an elongated type (such as buckhorn seed) will pass longitudinally within the longitudinal pathways which are defined by the protruding fibers, and that the seed of a rounded type will roll transversely across the inclined surface of the apron through the transverse pathways which are defined by the protruding fibers.

It should be understood that certain detail changes may be made in the structure of the mill without departing from the spirit of the invention, so long as these changes fall within the scope of the appended claims.

What is claimed as new is:

1. A mill of the class described comprising a frame, a conveyor apron extending longitudinally of the frame, a primary driving roller supporting one end of said apron, a companion roller supporting the opposite end of said apron, primary levers supporting said primary roller, a pivot supporting each primary lever, companion levers supporting said companion roller, each of said levers having a depending end, tension means connecting the depending ends of said primary levers to the companion levers for supporting said apron in a taut relation between the rollers, and crank means connected to said primary levers for oscillating said levers and agitating said apron in a longitudinal direction.

2. A mill of the class described comprising a frame, a conveyor apron extending longitudinally of the frame, a primary driving roller supporting one end of said apron, a companion roller supporting the opposite end of said apron, primary levers supporting said primary roller, a pivot supporting each primary lever, companion levers supporting said companion roller, each of said levers having a depending end, adjustable tension means connecting the depending ends of said primary levers to the companion levers for supporting said apron in a taut relation between the rollers, said primary levers having inclined depending arms, actuating links connected to said depending arms, a drive shaft, and eccentrics connected to said links for oscillating said primary levers and agitating said apron.

3. A mill of the class described comprising a frame, a conveyor apron extending longitudinally of the frame, a primary driving roller supporting one end of said apron, a companion roller supporting the opposite end of said apron, primary levers supporting said primary roller, a pivot supporting each primary lever, companion levers supporting said companion roller, each of said levers having a depending end, tension means connecting the depending ends of said primary levers to the companion levers for supporting said apron in a taut relation between the rollers, crank means connected to said primary levers for oscillating said levers and agitating said apron in a longitudinal direction, a second apron below said first mentioned apron, a second set of primary levers supporting one end of said second apron, and means for tying the primary levers of both aprons together to oscillate the levers in unison and to agitate the aprons in unison.

4. A mill of the class described comprising a frame, a conveyor apron extending longitudinally of the frame, a primary driving roller supporting one end of said apron, a companion roller supporting the opposite end of said apron, primary levers supporting said primary roller, a pivot supporting each primary lever, companion levers supporting said companion roller, tension means interposed between said primary levers and the companion levers for supporting said apron in a taut relation between the rollers, crank means connected to said primary levers for oscillating said levers and agitating said apron in a longitudinal direction, and a rigid table engaging and supporting said apron intermediate the rollers.

5. A mill for separating clover seed from buckhorn seed comprising a rigid supporting frame, a traveling seed conveyor apron having a light nap upon its seed carrying surface, means supporting said apron in a transversely inclined position on said rigid frame, the apron having its longitudinal side edges in substantially horizontal planes, the transverse angle of inclination of said apron being less than the angle of repose of the clover seed, a flat smooth table rigidly mounted in a transversely inclined position beneath the apron and frictionally contacting the underface of the apron throughout its length and transverse area, means for feeding a mixture of seed to be separated to the apron adjacent the uppermost edge of the apron, and means for vibrating the apron in a longitudinal direction relative to and independently of the frame to induce the clover seed to roll down the transverse incline of the apron through the nap thereof and to impel the buckhorn seed longitudinally of the apron for discharge at the end of the apron.

OWEN L. HARRISON,
JACOB HART.

(References on following page)

REFERENCES CITED

The following references are of record in the file of this patent:

UNITED STATES PATENTS

| Number | Name | Date |
|---|---|---|
| 563,238 | Prinz | June 30, 1896 |
| 607,389 | Wild | July 12, 1898 |
| 885,692 | Evans et al. | Apr. 21, 1908 |
| 1,070,350 | Long et al. | Aug. 12, 1913 |
| 1,083,437 | DeVos et al. | Jan. 6, 1914 |
| 1,114,935 | Sutton | Oct. 27, 1914 |
| 1,224,484 | Mero | May 1, 1917 |
| 1,235,479 | Jarrell | July 31, 1917 |
| 1,317,181 | Sohn | Sept. 30, 1919 |
| 1,317,653 | Norelius | Sept. 30, 1919 |
| 1,426,957 | Chindbloom | Aug. 22, 1922 |
| 1,523,389 | Beythan | Jan. 20, 1925 |
| 2,156,716 | Beckwith | May 2, 1939 |
| 2,299,298 | Bignell | Oct. 20, 1942 |

FOREIGN PATENTS

| Number | Country | Date |
|---|---|---|
| 13,413 | Great Britain | Sept. 3, 1892 |
| 22,728 | Great Britain | Oct. 5, 1909 |